US012040125B2

(12) United States Patent
Yang

(10) Patent No.: US 12,040,125 B2
(45) Date of Patent: Jul. 16, 2024

(54) THIN RESONANT TRANSFORMER WITH LEAKAGE INDUCTANCE ADJUSTING STRUCTURE

(71) Applicant: YU JING TECHNOLOGY CO., LTD., Taoyuan (TW)

(72) Inventor: Sen-Tai Yang, Taoyuan (TW)

(73) Assignee: YU JING TECHNOLOGY CO., LTD., Taoyuan (TW)

( * ) Notice: Subject to any disclaimer, the term of this patent is extended or adjusted under 35 U.S.C. 154(b) by 574 days.

(21) Appl. No.: 17/401,537

(22) Filed: Aug. 13, 2021

(65) Prior Publication Data

US 2022/0102066 A1 Mar. 31, 2022

(30) Foreign Application Priority Data

Sep. 28, 2020 (TW) ................................ 109133656

(51) Int. Cl.

*H01F 27/30* (2006.01)
*H01F 5/04* (2006.01)
*H01F 27/08* (2006.01)
*H01F 27/29* (2006.01)
*H01F 27/32* (2006.01)

(52) U.S. Cl.

CPC ............ *H01F 27/325* (2013.01); *H01F 5/04* (2013.01); *H01F 27/08* (2013.01); *H01F 27/29* (2013.01); *H01F 27/306* (2013.01); *H01F 2005/043* (2013.01)

(58) Field of Classification Search

CPC .................................................... H01F 27/325
USPC ........................................................ 336/198
See application file for complete search history.

(56) References Cited

U.S. PATENT DOCUMENTS

2011/0050379 A1* 3/2011 Kim ...................... H01F 27/306 336/200
2011/0260818 A1* 10/2011 Kim .................... H01F 27/2871 336/92
2012/0002387 A1* 1/2012 Park ....................... H05B 41/02 361/679.01
2013/0002386 A1* 1/2013 Park .................... H01F 27/2828 336/192
2013/0002390 A1* 1/2013 Nam ..................... H01F 27/325 336/207
2013/0154787 A1* 6/2013 Maeda .................. H01F 27/326 336/220

(Continued)

FOREIGN PATENT DOCUMENTS

TW M560684 U 5/2018

*Primary Examiner* — Ronald Hinson

(74) *Attorney, Agent, or Firm* — Ying-Ting Chen; Law Office of Michael Chen

(57) ABSTRACT

A thin resonant transformer includes a wire bobbin having a spool, an inner winding wound around the spool, a magnetic plate mounted in the wire bobbin, an outer winding wound in the wire bobbin and encompassing the inner winding and the magnetic plate, and two symmetric magnetic cores mounted on the wire bobbin. The wire bobbin has a top provided with a top plate and a bottom provided with a bottom plate. The magnetic plate is arranged between the inner winding and the outer winding. The inner winding, the outer winding, and the two magnetic cores generate a first magnetic circuit. The magnetic plate, the inner winding, and the outer winding generate a second magnetic circuit.

10 Claims, 6 Drawing Sheets

(56) References Cited

U.S. PATENT DOCUMENTS

| | | | | |
|---|---|---|---|---|
| 2014/0125442 | A1* | 5/2014 | Cheon | H01F 27/29 336/192 |
| 2014/0266540 | A1* | 9/2014 | Yang | H01F 27/2866 336/192 |
| 2015/0332843 | A1* | 11/2015 | Kajiyama | H01F 5/00 336/198 |
| 2015/0357111 | A1* | 12/2015 | Sasaki | H01F 5/04 29/605 |
| 2015/0364245 | A1* | 12/2015 | Jang | H01F 27/2804 336/208 |
| 2018/0254143 | A1* | 9/2018 | Yang | H01F 27/325 |
| 2021/0249180 | A1* | 8/2021 | Horikawa | H01F 27/2828 |

* cited by examiner

THIN RESONANT TRANSFORMER WITH LEAKAGE INDUCTANCE ADJUSTING STRUCTURE

BACKGROUND OF THE INVENTION

1. Field of the Invention

The present invention relates to a transformer and, more particularly, to a thin resonant transformer.

2. Description of the Related Art

A conventional transformer can carry a leakage inductance when the coupling coefficient between the primary side coil and the secondary side coil in the transformer is less than one. Due to less coupling, part of the transformer coil will not have a voltage transforming effect, thereby producing the leakage inductance. The basic formula of the resonant transformer is $\omega=1/\sqrt{}\,(LC)$, where $\omega(=2\pi f)$ is the angular frequency of the power supply, while L and C are the inductance and capacitance of the LLC resonant tank or circuit. The resonant frequency f is often set differently for different applications. In order to meet the requirements of different resonant frequencies f the value of L and C must be adjustable. In order to locate the resonant point accurately, the parameters need to be adjusted in a stepless manner, but it is difficult for the parameters to be adjusted in a stepless manner. Therefore, modern resonant transformers generally used in variable frequency power needs to adjust the value of $\omega$, but it is impossible to directly adjust leakage inductance within the resonant transformer, thus decreasing the effectiveness of the resonant transformer.

A conventional transformer was disclosed in the Taiwanese Patent Publication No. M560684, and comprises a winding frame, a first magnetic core, and a second magnetic core, and multiple coils. The winding frame includes a hollow winding part with a magnetic core central hole, and a side winding part with a magnetic core side hole. The first magnetic core includes a first magnetic core center pole and a first magnetic core side pole. The second magnetic core includes a second magnetic core center pole and a second magnetic core side pole. The first and second magnetic core center pole are inserted into the magnetic core central holes respectively, the first and second magnetic core side poles are respectively inserted into the magnetic core side holes respectively, and a gap is defined between the top surface of the first magnetic core side pole and the top surface of the second magnetic core side pole. The coil is wound around the hollow winding part and the side winding part.

However, such a conventional transformer has the following disadvantages.

1. Please refer to FIG. 3 and FIG. 5 of the M560684 case. In the primary side coil and/or the secondary side coil, at least one turn will be wound at the hollow winding part and the side winding part at the same time. The hollow winding part and the side winding part are separated by the side plate, to prevent the coil of the side winding part from touching the first and second magnetic core side pole. Therefore, the volume of the transformer cannot be shortened largely. The M560684 case increases the structure of the side plate, so that the volume of the transformer is increased.

2. In the pin design of the conventional transformers, the lead pins are arranged on both sides of the winding frame of the transformer to separate the primary and secondary lead pins and to prevent a signal interference. However, when the side plate is provided on one side of the transformer, the lead terminal unit has to be arranged on the other side of the transformer. The current of the primary side coil is usually larger than that of the secondary side coil. Therefore, a signal interference is easily produced between the first and second lead terminal units. Besides, the distance between the first and second lead terminal units is too short so that the insulating effect is not enough.

3. According to the M560684 case, it can be known that it is to solve the problem of transformer coupling which is difficult to control and easy to produce leakage magnetic flux. The technical means to solve the problem is that "by adjusting the gap between the top surfaces of the first core side poles and the top surfaces of the second core side poles to change the coupling coefficient between the primary coil and the secondary coil". Therefore, it is obvious that the transformer in the M560684 case is a power transformer and can only function as the power transformer. If the structure of the M560684 case is applied in a resonant transformer, the distance between the first and second lead terminal units is too close, causing a signal interference and an insufficient insulation distance.

4. The M560684 case stated that "the winding frame can also be formed as one body, that is, the winding frame can define the side hole of the magnetic core as shown in the figure without the need to engage the body and the side plate, but directly form a structure with the magnetic core center hole and the magnetic core side hole". In addition, in the primary side coil and/or the secondary side coil, at least one turn will be wound at the hollow winding part and the side winding part at the same time. If the winding frame is one body formed to directly form the core side hole without using the side plate, the space between the primary and secondary side coils cannot allow passage of the first and second core side poles. In FIG. 3 of the M560684 case, the secondary side coil will directly rest on the side coil when the side plate is removed. The more important reason is that no matter what kind of transformer, the primary and secondary coils have to be wound around the winding frame before mounting the core. Therefore, the M560684 case cannot actually be one body formed to directly construct the structure with the magnetic core center hole and the magnetic core side hole.

5. The first and second magnetic cores of the M560684 case must extend the first and second magnetic conductors in order to match the core side holes of the winding frame, and then the first and second magnetic core side poles are arranged on the surfaces of the first and second magnetic conductors. The first and second magnetic conductors extend the distance of the first and second magnetic core side poles. The first and second magnetic core side poles protrude from the magnetic core and are too thin so that the first and second magnetic core side poles are easily broken or deformed, resulting in an increase in production costs. In addition, in the M560684 case, the first and second magnetic cores have a recessed gap. The magnetic field generated by the primary and secondary side coils located at the gap is actually radiated out of transformer, and will not pass through the first and second magnetic cores, thereby reducing the magnetic shielding of the overall transformer.

BRIEF SUMMARY OF THE INVENTION

The primary objective of the present invention is to provide a thin resonant transformer having a leakage inductance adjusting structure to regulate a leakage inductance remaining the same smallest volume.

Another objective of the present invention is to provide a thin resonant transformer that is assembled quickly and has a great magnetic guiding ability.

A further objective of the present invention is to provide a thin resonant transformer having a high electromagnetic shielding effect.

In accordance with the present invention, there is provided a thin resonant transformer comprising a wire bobbin, an inner winding, a magnetic plate, an outer winding, and two symmetric magnetic cores. The wire bobbin has a spool having a hollow interior. The wire bobbin has a top provided with a top plate and a bottom provided with a bottom plate. The top plate is provided with a first through hole. The bottom plate is provided with a second through hole aligning with the first through hole. The inner winding is wound around the spool. The magnetic plate is mounted in the wire bobbin. The magnetic plate has an upper end closely fit in the first through hole and a lower end closely fit in the second through hole. The outer winding is wound in the wire bobbin and encompasses the inner winding and the magnetic plate. The outer winding secures the magnetic plate in the wire bobbin. The magnetic plate is arranged between the inner winding and the outer winding. Each of the two magnetic cores has a middle pole and two symmetric side poles. The middle poles of the two magnetic cores are inserted into the spool and contact each other. The two side poles of the two magnetic cores cover two sides of the spool and contact each other. The inner winding, the outer winding, and the two magnetic cores generate a first magnetic circuit. The magnetic plate, the inner winding, and the outer winding generate a second magnetic circuit.

Preferably, the top plate is provided with two side boards formed on two sides thereof. A top face of each of the two side boards and a surface of one of the two magnetic cores are coplanar.

Preferably, the bottom plate has a first side provided with a first wire holder and a second side provided with a second wire holder. A bottom face of the first wire holder, a bottom face of the second wire holder, and a surface of one of the two ferrite cores are coplanar.

Preferably, an upper end face of the magnetic plate and a surface of the top plate are coplanar, while a lower end face of the magnetic plate and a surface of the bottom plate are coplanar.

Preferably, each of the two magnetic cores is provided with a recessed portion aligning with the first through hole and the second through hole, and the magnetic plate is fit in the recessed portion. An upper end face of the magnetic plate and a surface of one of the two magnetic cores are coplanar, while a lower end face of the magnetic plate and a surface of the other one of the two magnetic cores are coplanar.

Preferably, the thin resonant transformer further comprises a first insulating layer enclosed around the two magnetic cores and securing the two magnetic cores to the wire bobbin so as to fix the two magnetic cores and to reinforce an insulating effect.

Preferably, the thin resonant transformer further comprises a second insulating layer enclosed around the two magnetic cores. The second insulating layer covers a connection of the two side poles of the two magnetic cores and covers the outer winding, to secure the two magnetic cores and the outer winding, and to enhance an insulating effect.

Preferably, the magnetic plate has a volume that is proportional to a leakage inductance of the resonant transformer, and has a magnetic that is proportional to the leakage inductance of the resonant transformer.

Preferably, each of the two side poles of each of the two magnetic cores has an end provided with a curvature. The thin resonant transformer further comprises an elastic plate having two ends each provided with a side wall having a distal end provided with a hook. The elastic plate is pressed between the two magnetic cores, and the hook of the elastic plate is respectively hooked on the curvature of each of the two magnetic cores, to position the two magnetic cores.

Preferably, when the inner winding is a secondary winding wound around the spool, the outer winding is a primary winding, and when the inner winding is a primary winding wound around the spool, the outer winding is a secondary winding.

Further benefits and advantages of the present invention will become apparent after a careful reading of the detailed description with appropriate reference to the accompanying drawings.

BRIEF DESCRIPTION OF THE SEVERAL VIEWS OF THE DRAWING(S)

DETAILED DESCRIPTION OF THE INVENTION

Figure 1:
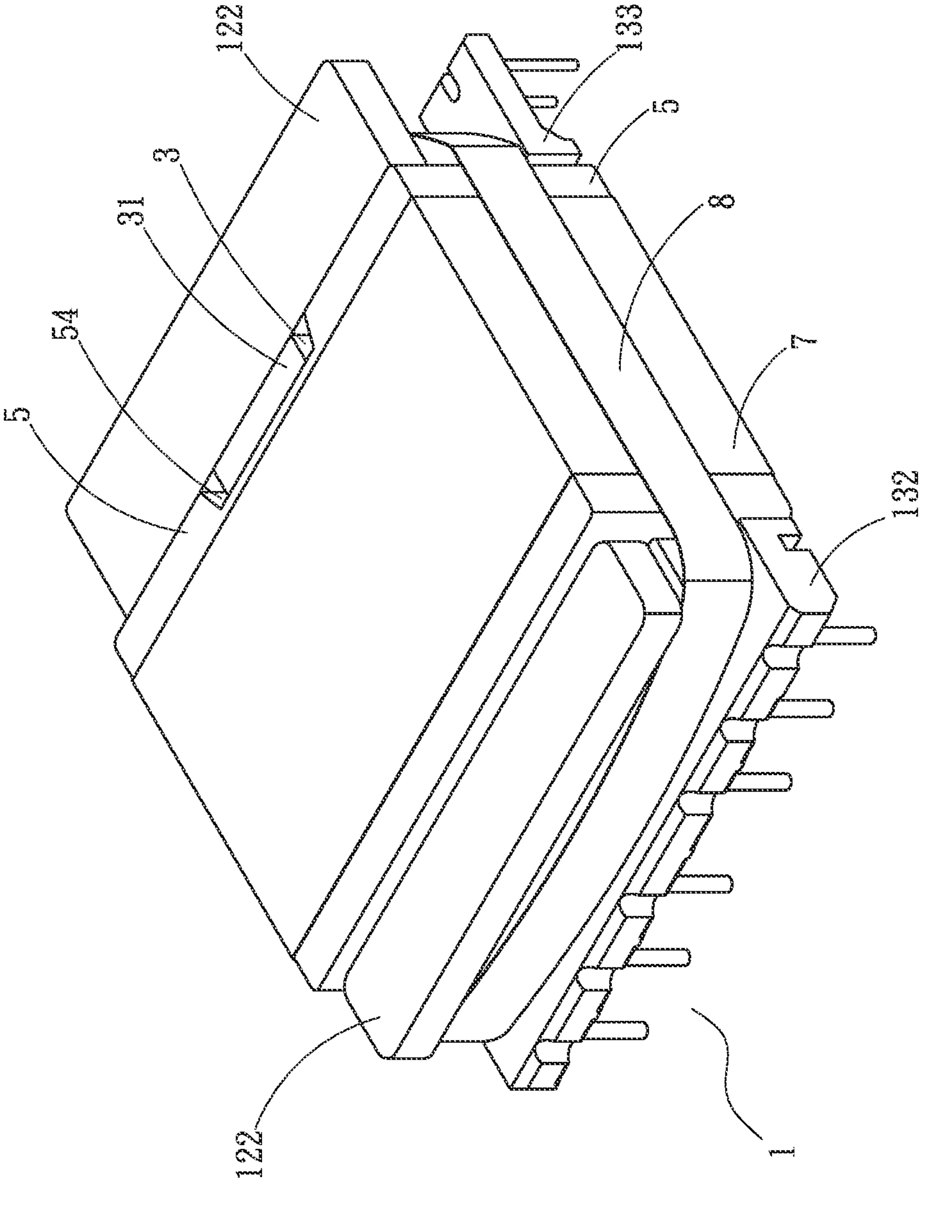
FIG. 1 is a perspective view of a thin resonant transformer in accordance with the preferred embodiment of the present invention.
Figure 2:
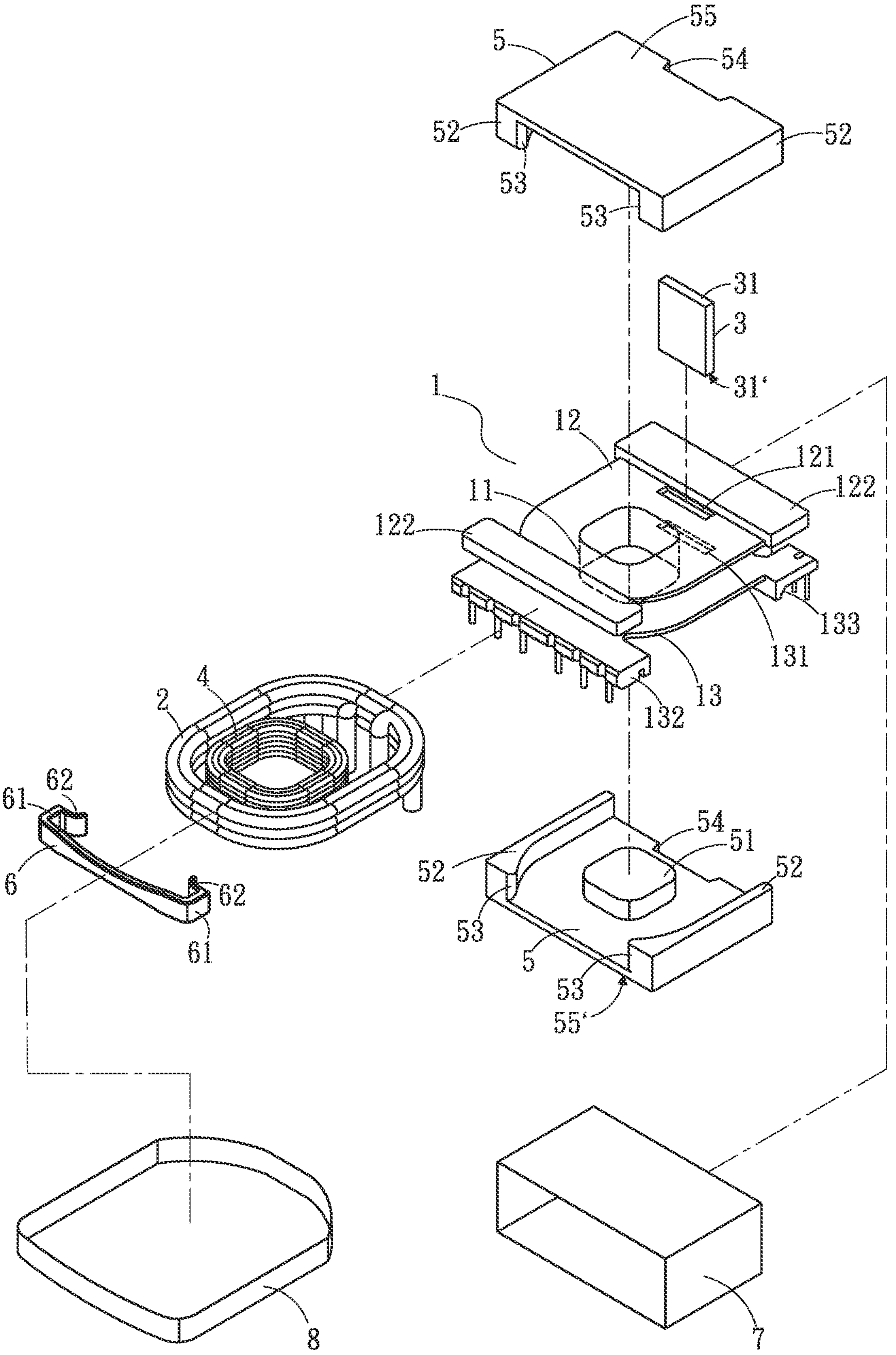
FIG. 2 is an exploded perspective view of the thin resonant transformer in accordance with the preferred embodiment of the present invention.
Figure 3:
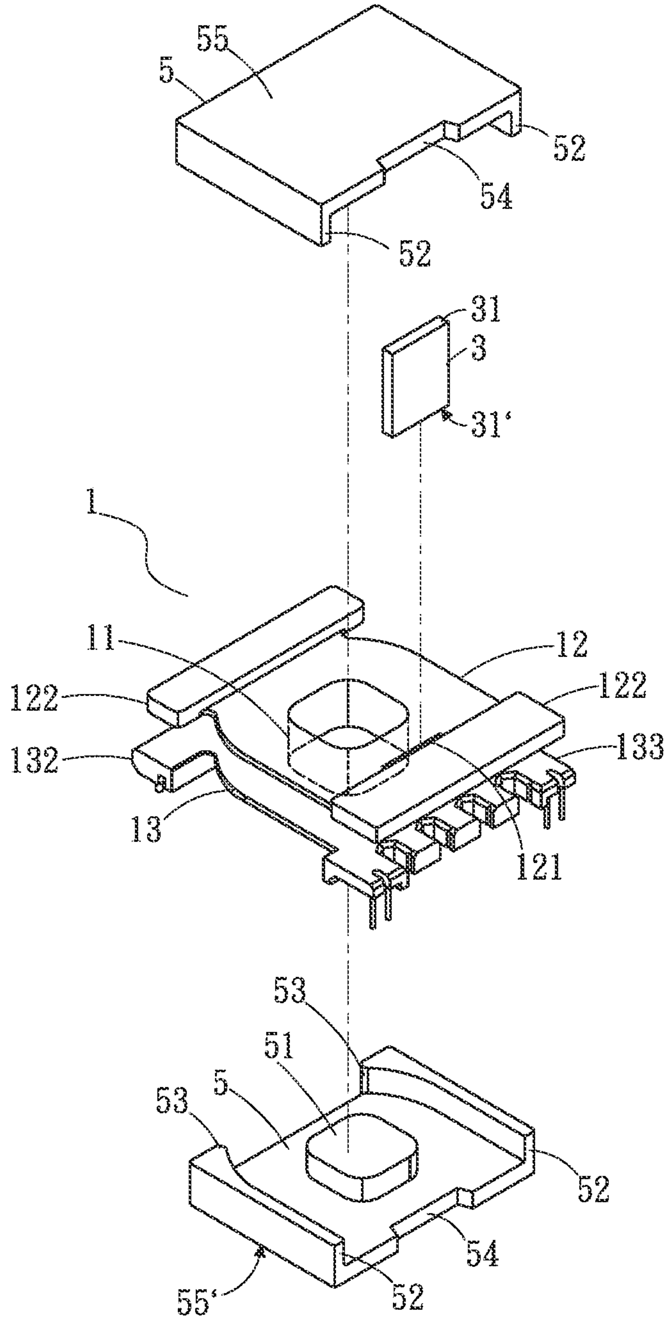
FIG. 3 is a partial exploded perspective view of the thin resonant transformer in accordance with the preferred embodiment of the present invention.
Figure 4:
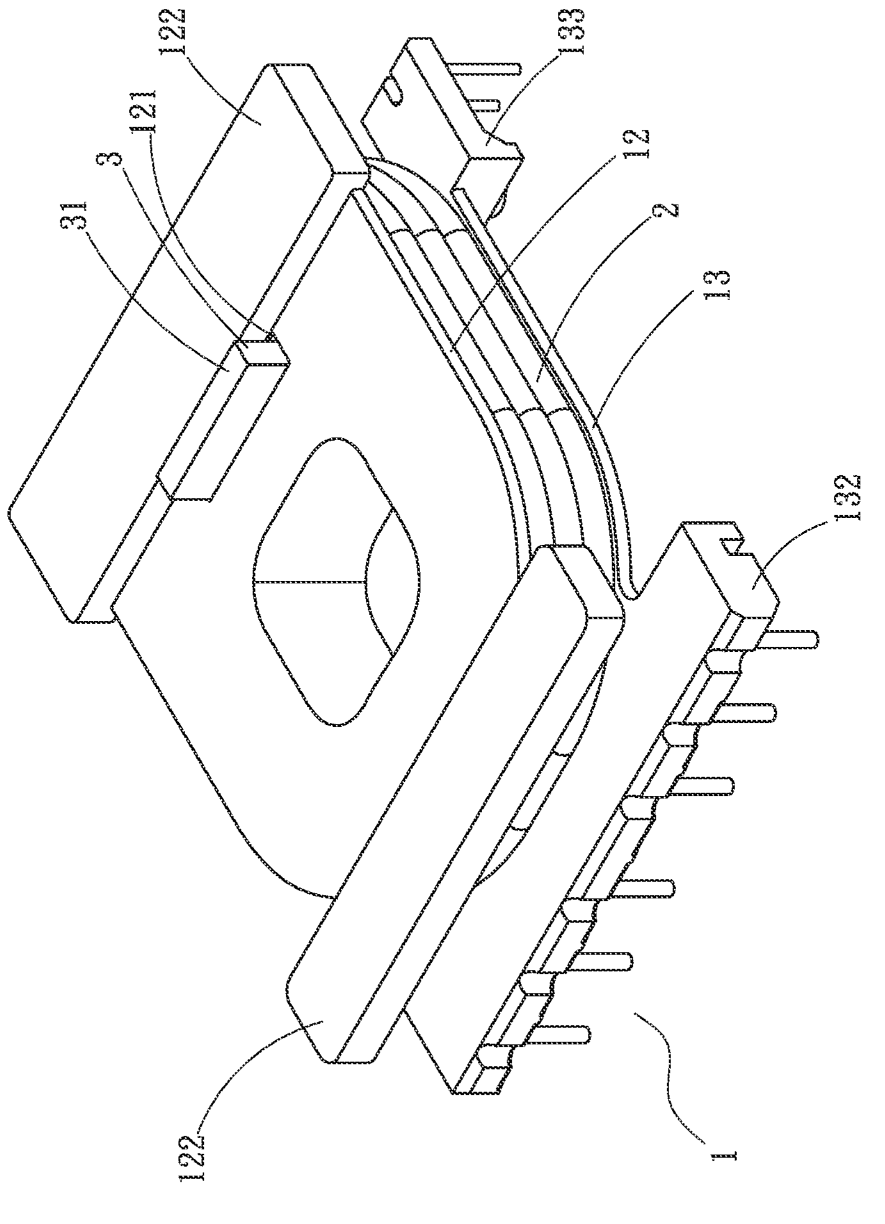
FIG. 4 is a partial perspective assembly view of the thin resonant transformer in accordance with the preferred embodiment of the present invention.
Figure 5:
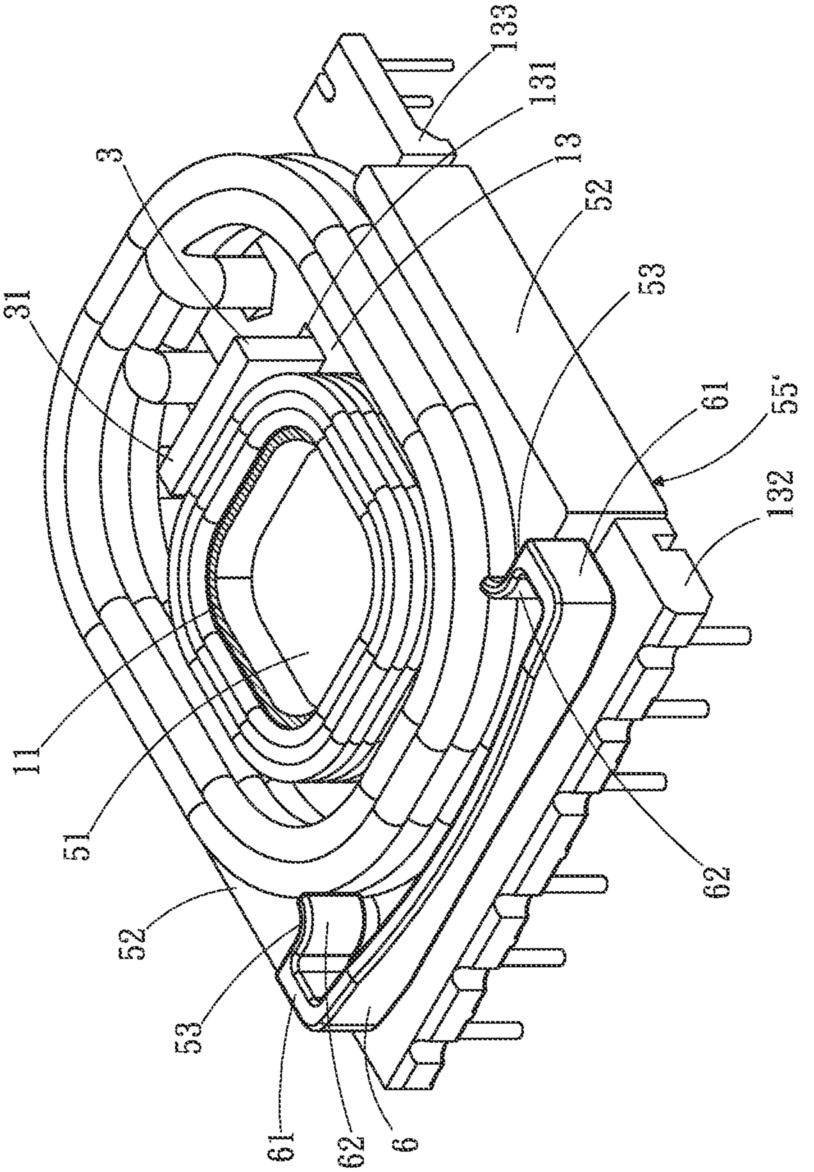
FIG. 5 is a partial perspective cross-sectional view of the thin resonant transformer in accordance with the preferred embodiment of the present invention.

Referring to FIGS. 1-6, a thin resonant transformer in accordance with the preferred embodiment of the present invention comprises a wire bobbin (or frame) 1, an inner winding (or coil) 4, a magnetic plate 3, an outer winding (or coil) 2, and two symmetric magnetic cores 5.

The wire bobbin 1 has a spool (or reel) 11 having a hollow interior. The wire bobbin 1 has a top provided with a top plate 12 and a bottom provided with a bottom plate 13. The top plate 12 is provided with a first through hole 121. The bottom plate 13 is provided with a second through hole 131 aligning with the first through hole 121.

The inner winding 4 is wound around the spool 11.

The magnetic plate 3 is mounted in the wire bobbin 1. The magnetic plate 3 has an upper end closely fit in the first through hole 121 and a lower end closely fit in the second through hole 131. Preferably, the magnetic plate 3 is made of a ferrite or magnet core with a magnetic permeance or conductance.

The outer winding 2 is wound in the wire bobbin 1 and encompasses the inner winding 4 and the magnetic plate 3. The outer winding 2 secures the magnetic plate 3 in the wire bobbin 1. The magnetic plate 3 is arranged between the inner winding 4 and the outer winding 2.

Each of the two magnetic cores 5 has a middle pole (or stud) 51 and two symmetric side poles (or studs) 52. The middle pole 51 is arranged between the two side poles 52. The middle poles 51 of the two magnetic cores 5 are inserted into the spool 11 and contact each other. The two side poles 52 of the two magnetic cores 5 cover two sides of the spool 11 and contact each other.

In practice, the inner winding 4, the outer winding 2, and the two magnetic cores 5 generate a first magnetic circuit. The magnetic plate 3, the inner winding 4, and the outer winding 2 generate a second magnetic circuit.

In the preferred embodiment of the present invention, the top plate 12 is provided with two side boards 122 formed on two sides thereof. A top face of each of the two side boards 122 and a surface 55 of one of the two magnetic cores 5 are coplanar. Preferably, the top faces of the two side boards 122 are coplanar.

In the preferred embodiment of the present invention, the bottom plate 13 has a first side provided with a first wire holder 132 and a second side provided with a second wire holder 133. A bottom face of the first wire holder 132, a bottom face of the second wire holder 133, and a surface 55' of one of the two magnetic cores 5 are coplanar.

In the preferred embodiment of the present invention, an upper end face 31 of the magnetic plate 3 and a surface of the top plate 12 are coplanar, while a lower end face 31' of the magnetic plate 3 and a surface of the bottom plate 13 are coplanar.

In the preferred embodiment of the present invention, each of the two magnetic cores 5 is provided with a recessed portion 54 aligning with the first through hole 121 and the second through hole 131, and the magnetic plate 3 is fit in the recessed portion 54. The recessed portion 54 aligns with the middle pole 51. An upper end face 31 of the magnetic plate 3 and a surface 55 of one of the two magnetic cores 5 are coplanar, while a lower end face 31' of the magnetic plate 3 and a surface 55' of the other one of the two magnetic cores 5 are coplanar.

In the preferred embodiment of the present invention, the thin resonant transformer further comprises a first insulating layer 7 enclosed around the two magnetic cores 5 and securing the two magnetic cores 5 to the wire bobbin 1 so as to fix the two magnetic cores 5 and to reinforce an insulating effect.

In the preferred embodiment of the present invention, the thin resonant transformer further comprises a second insulating layer 8 enclosed around the two magnetic cores 5. The second insulating layer 8 covers a connection of the two side poles 52 of the two magnetic cores 5 and covers the outer winding 2, to secure the two magnetic cores 5 and the outer winding 2, and to enhance an insulating effect.

In the preferred embodiment of the present invention, the magnetic plate 3 has a volume that is proportional to a leakage inductance of the resonant transformer, and has a magnetic that is proportional to the leakage inductance of the resonant transformer.

In the preferred embodiment of the present invention, each of the two side poles 52 of each of the two magnetic cores 5 has an end provided with a curvature 53. The thin resonant transformer further comprises an elastic plate 6 having two ends each provided with a side wall 61 having a distal end provided with a hook 62. The elastic plate 6 is pressed between the two magnetic cores 5, and the hook 62 of the elastic plate 6 is respectively hooked on the curvature 53 of each of the two magnetic cores 5, to position the two magnetic cores 5.

In the preferred embodiment of the present invention, when the inner winding 4 is a secondary winding wound around the spool 11, the outer winding 2 is a primary winding, and when the inner winding 4 is a primary winding wound around the spool 11, the outer winding 2 is a secondary winding.

Figure 6:
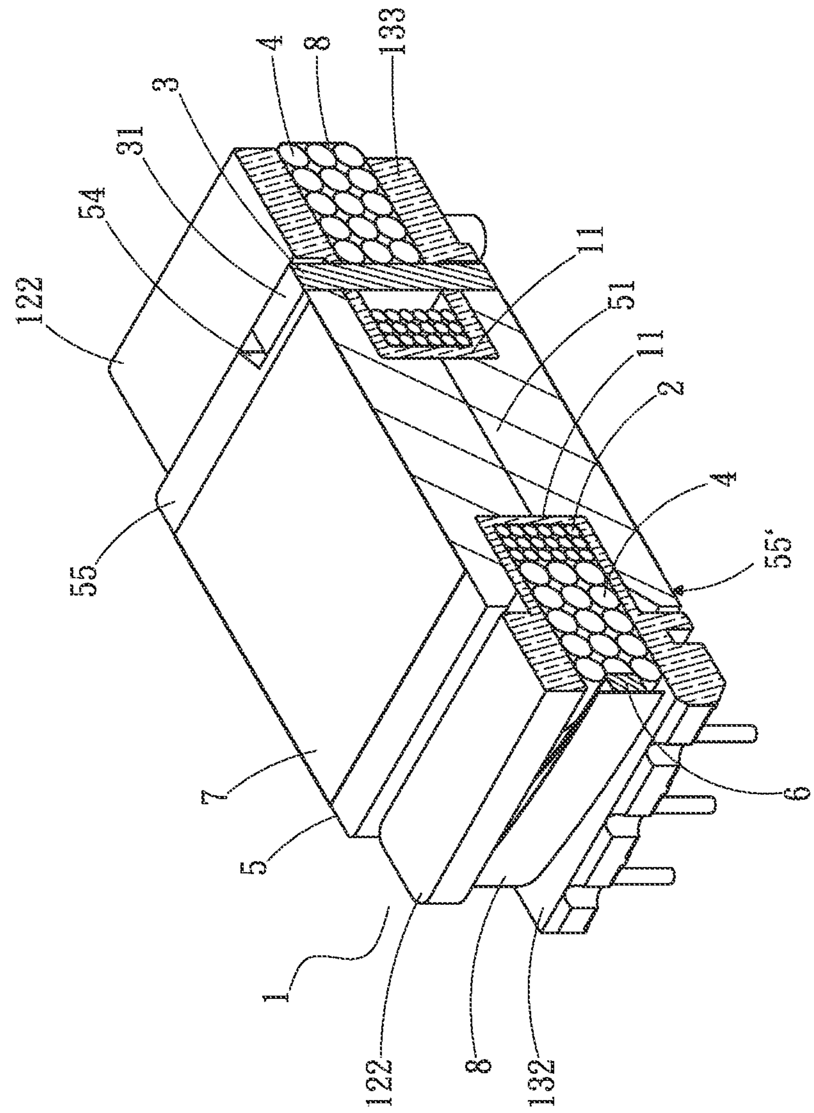
FIG. 6 is a perspective cross-sectional view of the thin resonant transformer in as shown in FIG. 1.

In assembly, the inner winding 4 is wound around the spool 11 and presses the magnetic plate 3 so that the magnetic plate 3 is closely fit in the first through hole 121 and the second through hole 131. The upper end of the magnetic plate 3 protrudes from the first through hole 121, and the lower end of the magnetic plate 3 protrudes from the second through hole 131. At this time, the upper end face 31 of the magnetic plate 3 and the top face of each of the two side boards 122 of the wire bobbin 1 are coplanar, while the lower end face 31' of the magnetic plate 3, the bottom face of the first wire holder 132, and the bottom face of the second wire holder 133 are coplanar. Then, the outer winding 2 is wound in the wire bobbin 1 and encompasses the inner winding 4 and the magnetic plate 3 to secure the magnetic plate 3 in the first through hole 121 and the second through hole 131 of the wire bobbin 1. It is to be noted that, FIG. 5 omits an upper half of the two magnetic cores 5 and simplifies the outer winding 2 to illustrate the magnetic plate 3 in the wire bobbin 1. As shown in FIG. 6, it is clear that the outer winding 2 closely surrounds the inner winding 4 and the magnetic plate 3.

It is appreciated that, the outer winding 2 and the inner winding 4 have different functions. When the outer winding 2 is a primary winding, the inner winding 4 is a secondary winding, and when the outer winding 2 is a secondary winding, the inner winding 4 is a primary winding. Thus, when the inner winding 4 is a secondary winding wound around the spool 11, the outer winding 2 is a primary winding, and when the inner winding 4 is a primary winding wound around the spool 11, the outer winding 2 is a secondary winding.

Subsequently, the middle poles 51 of the two magnetic cores 5 are inserted into the spool 11 and contact each other, and the two side poles 52 of the two magnetic cores 5 cover the two sides of the spool 11 and contact each other. Then, the elastic plate 6 is mounted between the two magnetic cores 5, and the hook 62 of the elastic plate 6 is respectively hooked on the curvature 53 of each of the two side poles 52 of each of the two magnetic cores 5, to position the two magnetic cores 5 by the elastic force of the elastic plate 6. In such a manner, the elastic plate 6 absorbs vibration produced during a high frequency. After the two magnetic cores 5 are mounted on the wire bobbin 1, the top face of each of the two side boards 122 and the surface 55 of the upper half of the two magnetic cores 5 are coplanar, while the bottom face of the first wire holder 132, the bottom face of the second wire holder 133, and the surface 55' of the lower half of the two magnetic cores 5 are coplanar.

Thus, the inner winding 4 and the outer winding 2 generate the first magnetic circuit through the two magnetic cores 5, while the magnetic plate 3 is arranged between the inner winding 4 and the outer winding 2 to generate the second magnetic circuit, so that the magnetic plate 3 constructs a leakage inductance adjusting structure of the resonant transformer, and the resonant transformer produces a leakage inductance with a required intensity by provision of the magnetic plate 3. Preferably, the magnetic plate 3 produces different leakage inductance to satisfy resonant transformers with different power drivers and power supplies. It is appreciated that, the volume and the magnetic of the magnetic plate 3 is proportional to the leakage inductance produced by the resonant transformer. In such a manner, the volume of the magnetic plate 3 is changed to adjust the leakage inductance of the resonant transformer.

Thus, the leakage inductance of the resonant transformer is adjusted in a stepless or continuously variable manner by changing the volume of the magnetic plate 3.

Subsequently, the first insulating layer 7 is enclosed around the two magnetic cores 5 vertically and closely secures the two magnetic cores 5 to the wire bobbin 1 so as to fix the two magnetic cores 5 and to reinforce the insulating effect. Then, the second insulating layer 8 is enclosed around the wire bobbin 1 horizontally to cover the connection of the two side poles 52 of the two magnetic cores 5, the outer winding 2, and the elastic plate 6, so that the two magnetic cores 5, the elastic plate 6, and the outer winding 2 are secured to the wire bobbin 1 closely. In addition, the second insulating layer 8 enhances the insulating effect.

The principle of the leakage inductance of the resonant transformer is described as follows. The magnetic flux (or inductance) interlinked to both of the primary winding (or the outer winding 2) and the secondary winding (or the inner winding 4) is the main (or mutual) flux (Φ12 or Φ21). The magnetic flux, which only links to the primary winding, and does not link to the secondary winding, is the primary leakage (or self) flux Φσ1. The magnetic flux, which only links to the secondary winding, and does not link to the primary winding, is the secondary leakage (or self) flux Φσ2. In general, a leakage flux in a transformer indicates a magnetic flux that does not flow in a magnetic circuit formed by the magnetic cores. The primary leakage flux is a primary leakage inductance corresponding to the primary winding, and the secondary leakage flux is a secondary leakage inductance corresponding to the secondary winding.

The equation of leakage inductance is listed as follows:

$$Le1=(1-k)\cdot L1$$

$$Le2=(1-k)\cdot L2$$

wherein, k is a coupling coefficient, Le1 is a leakage inductance of the primary winding, L1 is a primary (or self) inductance of the primary winding, Le2 is a leakage inductance of the secondary winding, and L2 is a secondary (or self) inductance of the secondary winding.

In conclusion, the thin resonant transformer of the present invention is different from the conventional transformer, and the characteristic is in that the leakage inductance of the resonant transformer is adjusted in a stepless or continuously variable manner by changing the volume of the magnetic plate 3. Thus, the leakage inductance of the resonant transformer is adjusted freely according to the user's requirement. Especially, the coupling coefficient is an important factor for determining the value of the leakage inductance. In a circuit layout, the coupling coefficient is defined as a ratio of an absolute value of a mutual inductance of two inductors (such as the inner winding 4 and the outer winding 2) and the maximum value of the mutual inductance of the two inductors. A positive current produces a positive inductance, and a negative current produces a negative inductance, so that the mutual inductance is derived from an absolute value so as to calculate the right value of the mutual inductance. In a mutual induction of two inductors, the maximum mutual inductance is produced and is defined as the maximum value. In the present invention, the magnetic plate 3 is arranged between the inner winding 4 and the outer winding 2 to generate the second magnetic circuit, so that the coupling coefficient between the inner winding 4 and the outer winding 2 is changed (by calculating the coupling coefficient between the inner winding 4 and the magnetic plate 3 and the coupling coefficient between the outer winding 2 and the magnetic plate 3). In the conventional transformer, the leakage flux is circulated between the primary winding and the secondary winding, thereby causing a great loss of the eddy current. In the present invention, the magnetic plate 3 is a magnetic material guiding the leakage flux back to the two magnetic cores 5, thereby preventing a loss of the eddy current.

Accordingly, the thin resonant transformer keeps the present volume. In addition, the thin resonant transformer is assembled quickly. Further, the thin resonant transformer has a great magnetic guiding ability. Further, the thin resonant transformer has a high electromagnetic shielding effect. Further, the thin resonant transformer has a leakage inductance adjusting structure constructed by the magnetic plate 3.

Although the invention has been explained in relation to its preferred embodiment(s) as mentioned above, it is to be understood that many other possible modifications and variations can be made without departing from the scope of the present invention. It is, therefore, contemplated that the appended claim or claims will cover such modifications and variations that fall within the scope of the invention.

The invention claimed is:

1. A thin resonant transformer comprising:

a wire bobbin, an inner winding, a magnetic plate, an outer winding, and two symmetric magnetic cores;

wherein:

the wire bobbin has a spool having a hollow interior;

the wire bobbin has a top provided with a top plate and a bottom provided with a bottom plate;

the top plate is provided with a first through hole;

the bottom plate is provided with a second through hole aligning with the first through hole;

the inner winding is wound around the spool;

the magnetic plate is mounted in the wire bobbin;

the magnetic plate has an upper end closely fit in the first through hole and a lower end closely fit in the second through hole;

the outer winding is wound in the wire bobbin and encompasses the inner winding and the magnetic plate;

the outer winding secures the magnetic plate in the wire bobbin;

the magnetic plate is arranged between the inner winding and the outer winding;

each of the two magnetic cores has a middle pole and two symmetric side poles;

the middle poles of the two magnetic cores are inserted into the spool and contact each other;

the two side poles of the two magnetic cores cover two sides of the spool and contact each other;

the inner winding, the outer winding, and the two magnetic cores generate a first magnetic circuit; and the magnetic plate, the inner winding, and the outer winding generate a second magnetic circuit.

2. The thin resonant transformer as claimed in claim 1, wherein the top plate is provided with two side boards formed on two sides thereof, and a top face of each of the two side boards and a surface of one of the two magnetic cores are coplanar.

3. The thin resonant transformer as claimed in claim 1, wherein the bottom plate has a first side provided with a first wire holder and a second side provided with a second wire holder, and a bottom face of the first wire holder, a bottom face of the second wire holder, and a surface of one of the two magnetic cores are coplanar.

4. The thin resonant transformer as claimed in claim 1, wherein an upper end face of the magnetic plate and a surface of the top plate are coplanar, and a lower end face of the magnetic plate and a surface of the bottom plate are coplanar.

5. The thin resonant transformer as claimed in claim 1, wherein:

each of the two magnetic cores is provided with a recessed portion aligning with the first through hole and the second through hole;

the magnetic plate is fit in the recessed portion;

an upper end face of the magnetic plate and a surface of one of the two magnetic cores are coplanar; and a lower end face of the magnetic plate and a surface of the other one of the two magnetic cores are coplanar.

6. The thin resonant transformer as claimed in claim 1, further comprising:

a first insulating layer enclosed around the two magnetic cores and securing the two magnetic cores to the wire bobbin so as to fix the two magnetic cores and to reinforce an insulating effect.

7. The thin resonant transformer as claimed in claim 1, further comprising:

a second insulating layer enclosed around the two magnetic cores;

wherein:

the second insulating layer covers a connection of the two side poles of the two magnetic cores and covers the outer winding, to secure the two magnetic cores and the outer winding, and to enhance an insulating effect.

8. The thin resonant transformer as claimed in claim 1, wherein the magnetic plate has a volume that is proportional to a leakage inductance of the resonant transformer, and has a magnetic that is proportional to the leakage inductance of the resonant transformer.

9. The thin resonant transformer as claimed in claim 1, wherein:

each of the two side poles of each of the two magnetic cores has an end provided with a curvature;

the thin resonant transformer further comprises an elastic plate having two ends each provided with a side wall having a distal end provided with a hook;

the elastic plate is pressed between the two magnetic cores; and the hook of the elastic plate is respectively hooked on the curvature of each of the two magnetic cores, to position the two magnetic cores.

10. The thin resonant transformer as claimed in claim 1, wherein when the inner winding is a secondary winding wound around the spool, the outer winding is a primary winding, and when the inner winding is a primary winding wound around the spool, the outer winding is a secondary winding.

* * * * *